F. A. HOLMES.
VALVE CONTROL FOR BURIAL CRYPTS.
APPLICATION FILED DEC. 4, 1911.
1,050,773.
Patented Jan. 14, 1913.
2 SHEETS—SHEET 1.
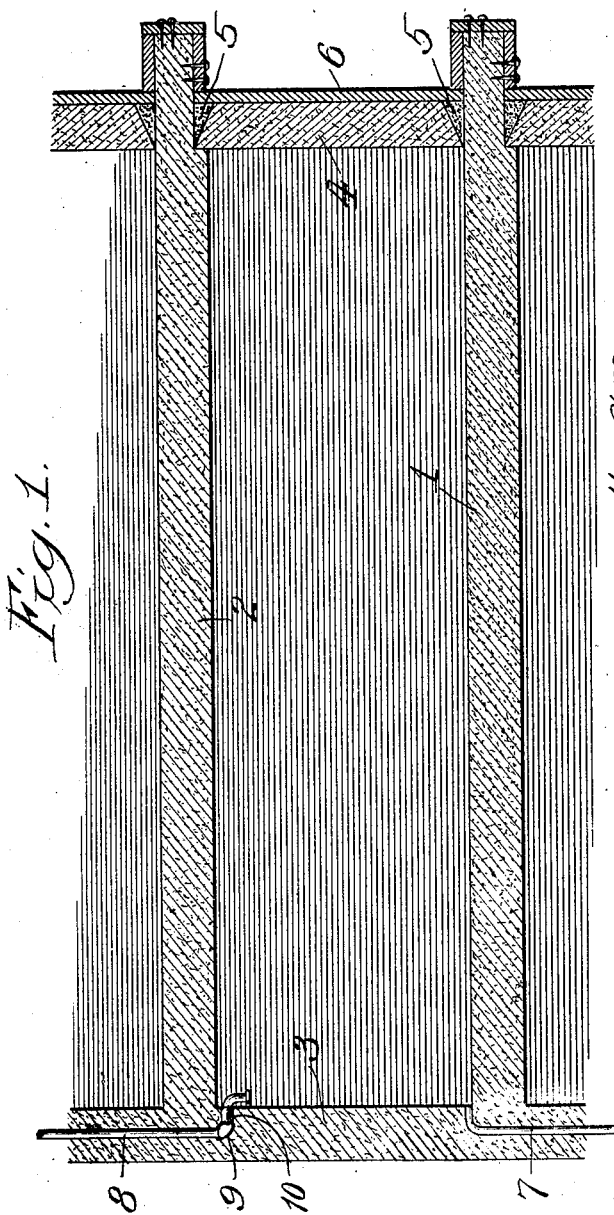
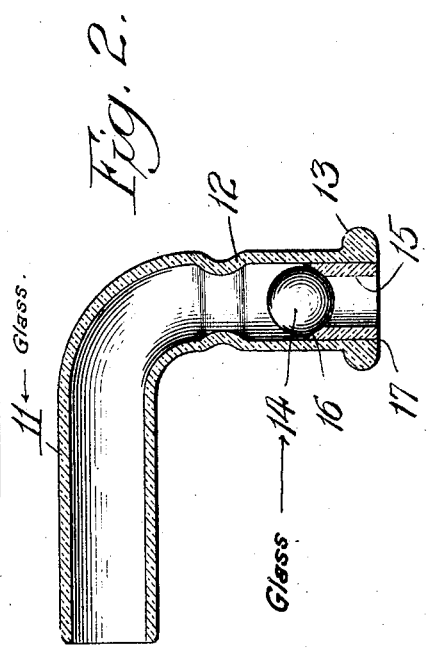
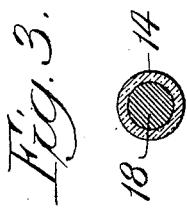
Witnesses:
John Enders
J. V. Curran
Inventor:
Frank A. Holmes,
by Wallace R. Lane
Atty.

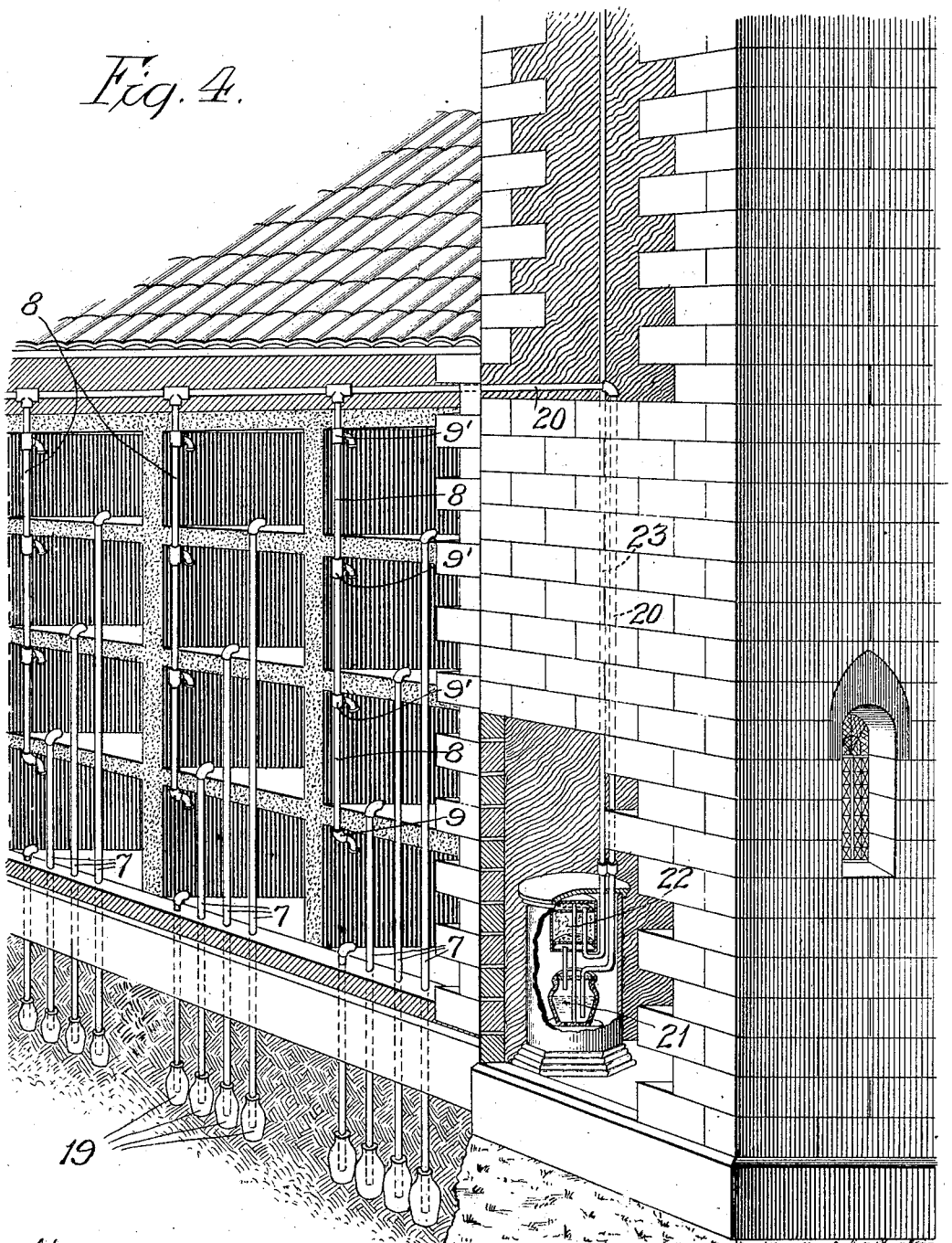

UNITED STATES PATENT OFFICE.

FRANK A. HOLMES, OF CHICAGO, ILLINOIS.

VALVE CONTROL FOR BURIAL-CRYPTS.

1,050,773.

Specification of Letters Patent. Patented Jan. 14, 1913.

Application filed December 4, 1911. Serial No. 663,897.

*To all whom it may concern:*

Be it known that I, FRANK A. HOLMES, a citizen of the United States, residing at Chicago, in the county of Cook and State of Illinois, have invented certain new and useful Improvements in Valve Control for Burial-Crypts, of which the following is a specification.

It is the object of the present invention to provide means adapted for use in connection with burial crypts or mausoleums and adapted to control the passage of air or gases into or out of a crypt, and more particularly from one crypt to another of the tier or series of which the mausoleum is built up.

The burial mausoleum may be constructed of a large number of crypts each made of concrete and tightly closed or sealed to gases, except for a valve-controlled port communicating with a system of vent ducts or pipes. According to the present invention, the valve control for these ports is so constructed as to permit the escape of gases from the crypt into the vent pipes, but to prevent the escape of those gases into another crypt, and also to prevent the free entrance of air into any of the crypts, each of the pipes being so constructed and arranged as to resist deterioration as by rust, corrosion or the like. The valve included in my present invention is free from springs or other adjuncts which might become inoperative through age and is adapted to remain in operative condition for many years.

The details of my invention will be better understood by reference to the following detailed description, taken in connection with the drawings annexed to and forming a part of this specification.

In the drawings, Figure 1 is a sectional elevation of a concrete burial crypt, showing a valve in position at the upper left hand corner. Fig. 2 is a sectional elevation through the valve. Fig. 3 is a section through a ball having a metal center enveloped in glass. Fig. 4 is a perspective view, somewhat diagrammatical, showing one side of a mausoleum torn away to expose the vent and drainage pipes of a group of burial crypts.

The burial crypt shown in Fig. 1 may be considered as one compartment or chamber in the complete building or mausoleum, illustrated by Fig. 4. The crypt has a concrete floor 1 and a concrete ceiling 2 together with suitable side walls and an end wall 3, all of which are of monolithic construction, free from joints or seams. A door or front wall 4 may be put in place across the entrance and there secured by cement 5 forming an air tight seal for that end of the crypt. The concrete slab 4 may be faced up with a marble slab 6 held in place in a suitable manner. At the rear of the crypt is a drain pipe 7 for fluids, and an exit or vent pipe 8 for gases, the latter having an elbow 9 from which a short pipe 10 projects forward slightly beyond the rear face of the crypt. Into this pipe 10 the exit valve is slipped, as shown in Fig. 1.

The exit valve is shown in detail in Fig. 2 and comprises a valve casing of glass having a horizontal portion 11 with a downturned or vertical portion, terminating in an enlargement or flange 13. The diameter of the horizontal portion 11, is such that the valve may be tightly fitted or cemented within the horizontal pipe 10 (Fig. 1). The interior chamber or bore of the valve casing is of substantially uniform diameter throughout, except for an annular constriction 12 integral with the valve casing, produced in suitable manner, as by upsetting the wall of the casing. This interior chamber or bore forms a chamber for holding a ball 14. This ball rests with a close fit on the upper edge of a collar 15, preferably of glass and having its upper edge 16 ground to a bevel and adapted to serve as a valve seat. This tubular collar 15 is secured to the valve casing by fusing together the lower edges of these two parts at 17.

The ball 14 is constructed of material which will not rust or corrode. Preferably it consists of glass, though a lead center 18 may be provided, as shown in Fig. 3, in cases where the glass alone might be insufficient for the purpose of insuring a tight fit.

The mausoleum construction illustrated by Fig. 4 shows a plurality of crypts arranged in tiers one above another and each provided with its fluid drain pipe 7 and its vent pipe 8. A single vent pipe can serve an entire tier of crypts, T-connections 9' being used for the upper crypts in place of the elbow 9 of the lower crypt. Each of the fluid pipes 7 leads to a disposal receptacle 19, which may contain quick-lime and serve as a trap or seal to prevent the entrance of air through the fluid pipe. The vent pipes 8 lead to a main exit pipe 20 whereby the gases may be conducted to a germ destroyer comprising a formaldehyde tank 21 and a filtering tank 22 from which the deodorized and purified gases may be conveyed to the open air through an outlet pipe 23.

It will be understood that any of the crypts of the mausoleum may remain empty or vacant for a number of years and may then be put to use and sealed up. However, the valve structure and its associated ducts or exit pipes here disclosed are of indestructible form and free from danger of rusting or corroding. They are so constructed as to be in reliable working condition when called upon to relieve the crypt of gases, possibly many years after the crypt was constructed, and they are at all times effective for preventing the entrance into the crypt of gases developed and escaping from another crypt in the tier or in the building.

What I claim as new and desire to secure by Letters Patent, is:—

1. In a mausoleum, the combination of a plurality of concrete crypts arranged adjacent to one another, a single vent pipe embedded in the concrete and serving a number of said crypts, and a glass valve casing for each of said crypts connecting with said pipe, each casing having a gravity actuated glass valve controlling the passage of gas from its crypt to said pipe.

2. In a mausoleum, the combination of a plurality of crypts, an exit pipe for gases mounted to serve said plurality of crypts, a glass casing projecting into each crypt and having a down-turned end forming a valve chamber, and a glass ball seated in said chamber and mounted to serve as a gravity actuated valve to permit the escape of gases from the crypt but to prevent the entrance of air or gases from the vent pipe.

In witness whereof, I hereunto subscribe my name to this specification in the presence of two witnesses.

FRANK A. HOLMES.

Witnesses:
I. V. CURRAN,
J. C. SHUTTS.